Jan. 27, 1953 O. C. W. HENZE ET AL 2,626,693

SPACE CONTROLLING MECHANISM FOR MULTIPITCH ESCAPEMENT TYPEWRITERS

Filed Aug. 11, 1950 9 Sheets-Sheet 1

INVENTORS
OTTO C.W. HENZE
BY JOSEPH LEE SWEENEY

Kenyon & Kenyon
ATTORNEYS

INVENTORS
OTTO C.W. HENZE
BY JOSEPH LEE SWEENEY
Kenyon & Kenyon
ATTORNEYS

INVENTORS
OTTO C.W. HENZE
BY JOSEPH LEE SWEENEY
Kenyon & Kenyon
ATTORNEYS

INVENTORS
OTTO C. W. HENZE
BY JOSEPH LEE SWEENEY
Kenyon & Kenyon
ATTORNEYS

INVENTORS
OTTO C.W. HENZE
BY JOSEPH LEE SWEENEY
Kenyon & Kenyon
ATTORNEYS

INVENTORS
OTTO C. W. HENZE
BY JOSEPH LEE SWEENEY
Kenyon & Kenyon
ATTORNEYS

INVENTORS
OTTO C.W. HENZE
BY JOSEPH LEE SWEENEY
Kenyon & Kenyon
ATTORNEYS

INVENTORS
OTTO C. W. HENZE
BY JOSEPH LEE SWEENEY
Kenyon & Kenyon
ATTORNEYS

INVENTORS
OTTO C.W. HENZE
BY JOSEPH LEE SWEENEY
Kenyon & Kenyon
ATTORNEYS

Patented Jan. 27, 1953 2,626,693

UNITED STATES PATENT OFFICE 2,626,693

SPACE CONTROLLING MECHANISM FOR MULTIPITCH ESCAPEMENT TYPEWRITERS

Otto C. W. Henze, New York, and Joseph Lee Sweeney, Jackson Heights, N. Y.; said Henze assignor to said Sweeney Application August 11, 1950, Serial No. 178,797

8 Claims. (Cl. 197—84)

This invention relates to typewriters and particularly to typewriters in which the spacing between individual characters is automatically controlled so that in the work produced on the typewriter there will be substantially uniform spacing between characters with each letter having a space allocation proportional to its width and in which it is possible to justify the work to control spacings and margins for various purposes and particularly to the mechanism for effecting this which can be used in connection with standard typewriters by providing minor variations in construction.

It has been common practice in the construction of typewriters to allocate to each letter or character the same space as is allocated for each other character regardless of the width of the characters. This has resulted in uneven spacing between letters and in a characteristic appearance in the work turned out on these typewriters which distinguishes the work from printing. It has also been customary to neglect justification so that the right-hand margin of work done on ordinary typewriters is uneven.

One object of this invention is to provide a typewriter in which all of the above difficulties are overcome in a simple, inexpensive manner and using mechanisms which may be easily and inexpensively incorporated into present-day typewriter designs.

Another object is to provide a typewriter and associated mechanism in which the proper spacing is provided for every character to produce even and uniform work.

Another object is to provide such a typewriter in which both upper and lower case characters are evenly spaced with each having the proper space allocation.

Another object is to provide such a typewriter in which even spacing and proper allocation of space is brought about by printing each character to a given initial line and controlling the escapement mechanism to provide a release commensurate with the width of the character printed so that even spacing is accomplished by printing the next character to the same initial line.

Another object is to provide such a typewriter having mechanism for justifying a line of work so as to maintain even margins.

Another object is to provide such a typewriter in which justification may be accomplished either by compressing or expanding a line of work or by controlling the spacing between words by infinite adjustment within predetermined limits, permitting the spacing between words to be easily and simply adjusted.

Another object is to provide such a typewriter which is adaptable for multiple typographic service.

Another object is to provide such a typewriter in which the correction of errors in misprinted words can be made without the appearance of crowding or in which emphasis may be put into the word by expansion or contraction within the script.

Other objects and advantages of the invention will be apparent to those skilled in the art from the following description of the novel construction and arrangement of parts of the essential features of a preferred form of the invention which are illustrated in the accompanying drawings in which.

Figure 1:
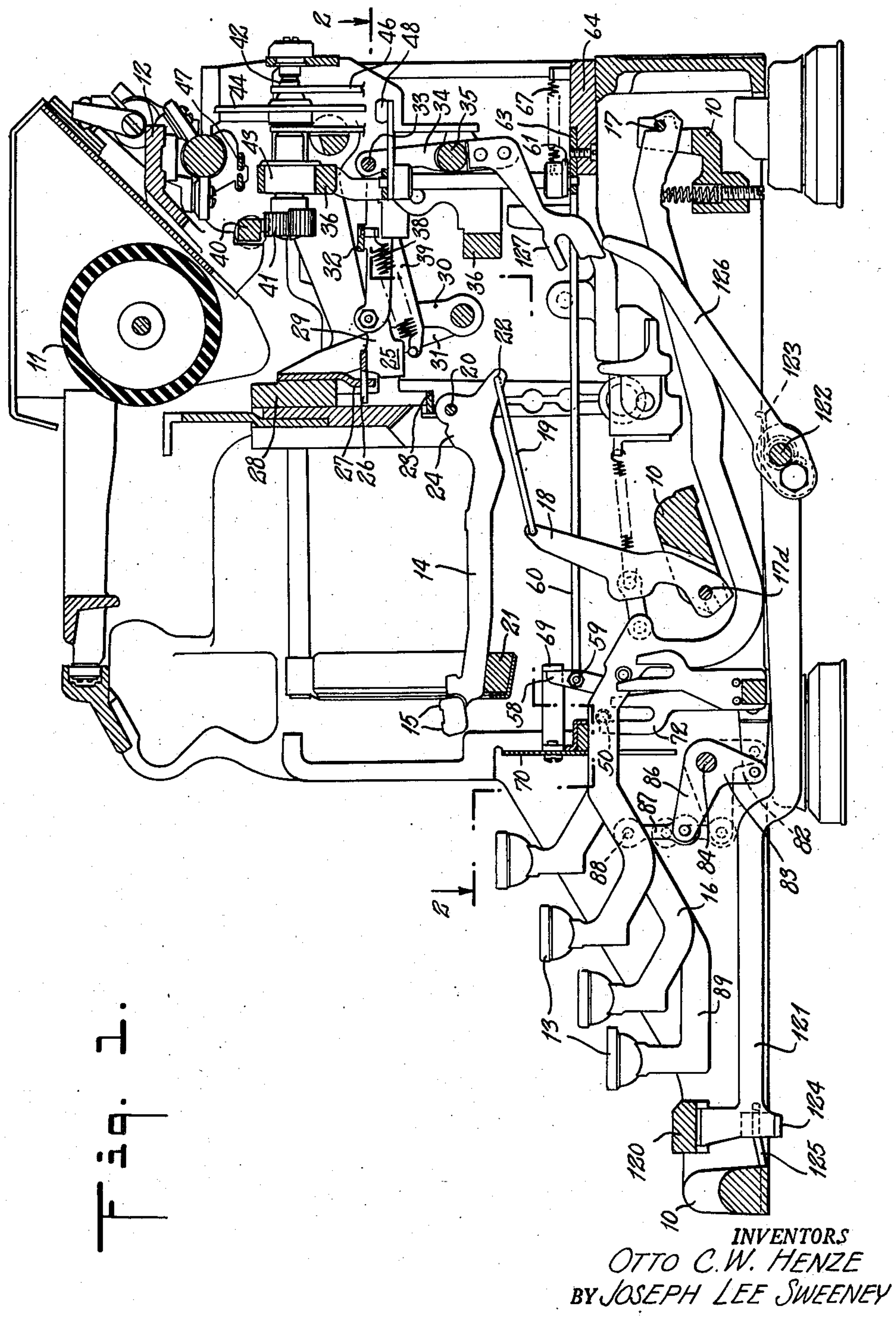
Fig. 1 is a side, sectional, elevational view of a typewriter taken substantially at the center line where the types strike against the platen and showing certain parts of the automatic space control mechanism.

In general the typewriting machine embodying this invention is provided with a conventional platen and carriage. It is provided with an escapement mechanism which can provide an infinite number of degrees of release so that the amount of release may correspond exactly with the width of every type employed. This escapement mechanism consists of a flat disk mounted for rotation and connected to be rotated by movement of the carriage. A ball clutch is provided to hold the disk in position and a swinging ball clutch is provided to control the amount of movement. This is brought about by a pair of adjustable stops and suitable mechanism is provided for timed release and actuation of the two clutches. This mechanism is generally like that disclosed in Pollock et al. Patent No. 2,364,654, issued December 12, 1944.

One of the adjustable stops controls the swinging of the swinging ball clutch in one direction and adjustment of this stop will either lengthen or shorten the amount of release provided by all operations of the escapement mechanism. The other adjustable stop is operatively connected to the typing mechanism with suitable connections so that its position will be determined by the type which has just been printed. Each of the types is set to print its initial edge at the same absolute point in the machine and the release of the escapement mechanism is so adjusted by adjusting this second stop that the platen is moved just the right distance to correspond to the character printed so that there will be uniform or equal spacing between all characters.

This last mechanism consists of a cam mechanism which is actuated by the individual type keys of the machine. Each type is provided with its own cam and by employing the afore-mentioned ball clutch and disk arrangement it is possible to provide the correct spacing for each and every character of any desired font of type.

In the preferred form of the invention the usual expedient of placing two characters or types on each printing arm is employed and the usual shifting mechanism for shifting from one to the other character is operatively connected to the cam mechanism so that an appropriate cam is provided for each character of each pair.

The adjustment of the first stop may be employed for justifying each line of printed matter either by making the same adjustment of the release for each character printed or the first stop may be adjusted merely to vary the spacing between words.

In the typewriter machine shown there is a frame consisting of numerous parts, all of which are stationary. These parts are designated by the reference character 10. The platen 11 is mounted on a carriage 12 which is slidably mounted for longitudinal movement in the frame 10 in a conventional manner. A plurality of keys 13 are operatively connected to type bars 14 which carry type bodies 15. The parts are so arranged that the types strike the platen 11 when the keys are depressed. The ribbon and paper have not been illustrated in the drawing, but it will be understood that the paper rolls around the platen, as is usual, and an inking ribbon is generally provided in front of the paper and is struck by the types when the machine is operated.

Figure 2:
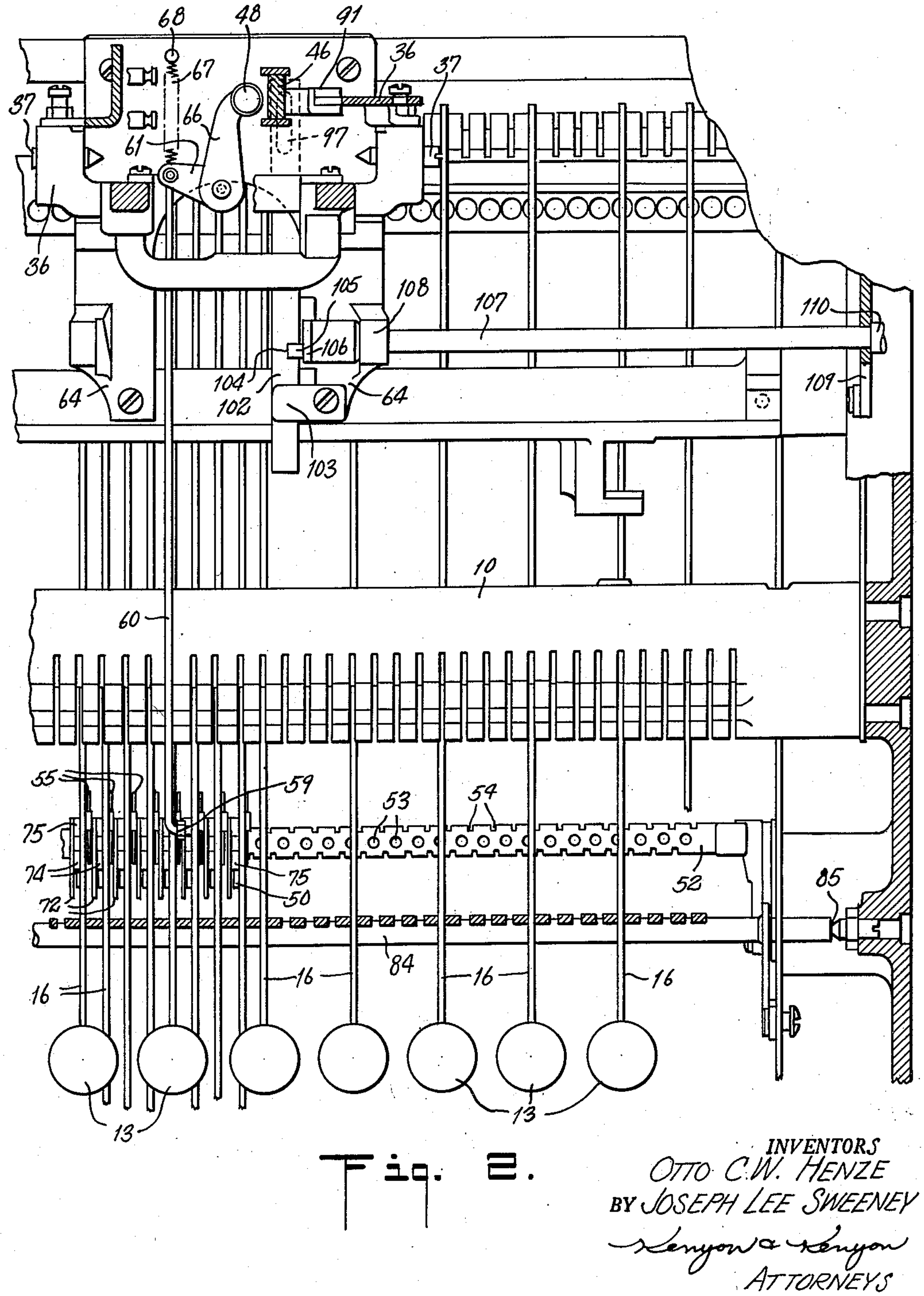
Fig. 2 is a sectional plan view of the typewriter shown in Fig. 1 with certain parts omitted taken on the line 2—2 of Fig. 1.
Figure 3:
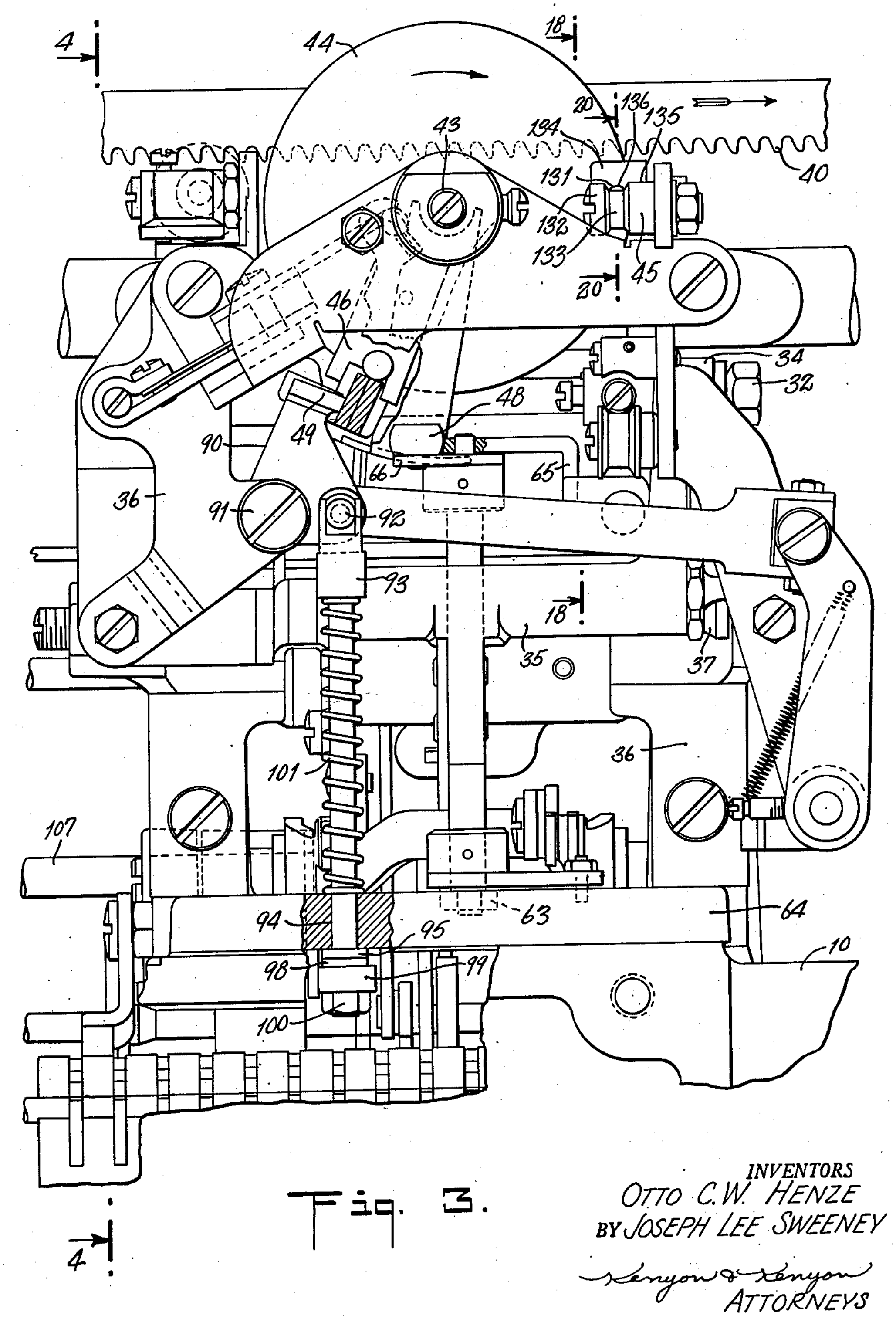
Fig. 3 is a rear elevation of a portion of the typewriter showing the escapement mechanism and the adjustable stops for space setting and justification.
Figure 4:
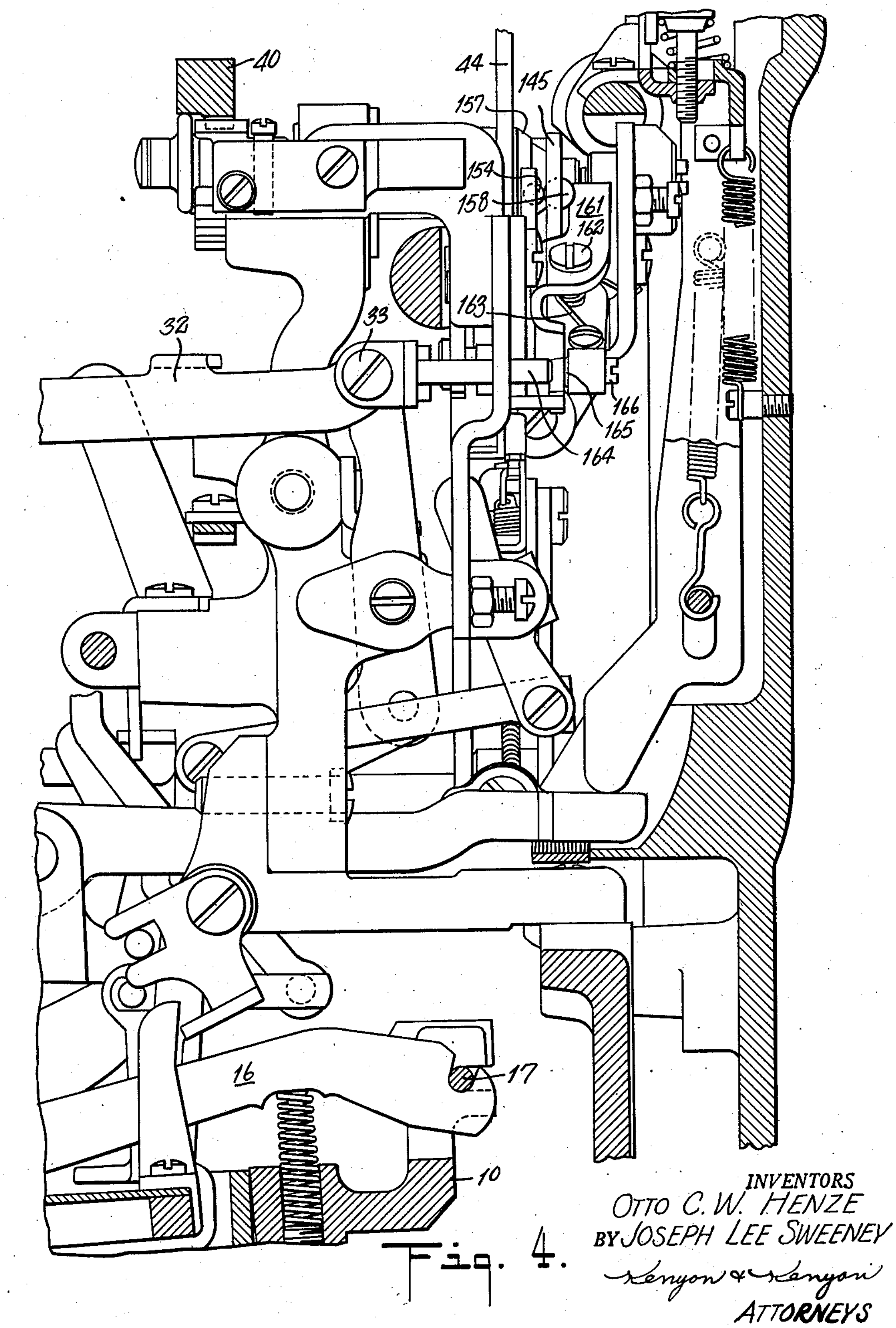
Fig. 4 is a detailed, sectional view taken on the line 4—4 of Fig. 3.
Figures 5, 6:
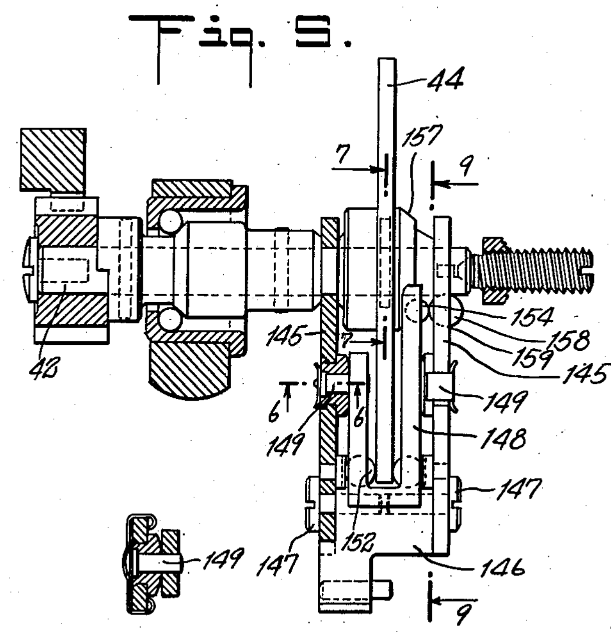
Fig. 5 is a detailed, sectional view of a portion of the escapement mechanism showing the movable clutch.
Fig. 6 is a detailed, sectional view taken on the line 6—6 of Fig. 5.
Figure 7:
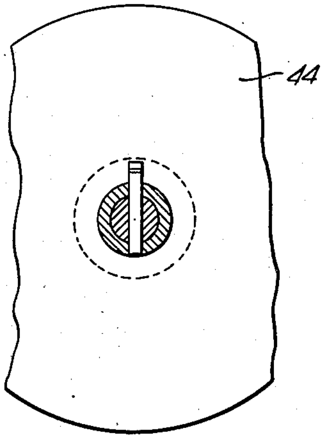
Fig. 7 is a detailed view partly in section showing a portion of the escapement disk.
Figure 8:
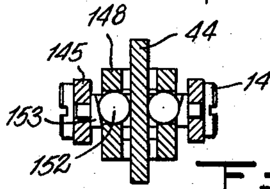
Fig. 8 is a detailed, sectional view taken on the line 8—8 of Fig. 10 showing details of the fixed clutch.

The keys 13 are mounted on key levers 16 which extend generally parallel to one another in relatively closely spaced relationship, as is best seen in Fig. 2. The levers 16 are pivoted at 17 to the frame 10. Upwardly extending arms 18, pivoted at 17*d* are operatively linked to the key levers 16. Wire hook connecting links 19 at the upper ends thereof are connected to the type bars 14. The type bars 14 are pivoted at 20 and normally lie in a horizontal position resting against cushion 21. Each type bar extends beyond its pivot 20 and is provided with an aperture 22, into which the wire hook connecting link 19 extends. When the key 13 is depressed the lever 16 pivots about its pivot 17, swinging the arm 18 forwardly in the machine in a counterclockwise direction about its pivot 17*d* as shown in Fig. 1. The wire hook link 19 thus causes the type bar 14 to swing upwardly about its pivot 20 in a clockwise direction as viewed in Fig. 1.

The escapement mechanism is operated by a bail 23 which is engaged by cam surfaces 24 formed on the type bars 14. It will be seen that the cam surfaces 24 engage the bail 23 to move it to the right, as viewed in Fig. 1, for the last small portion of the movement of the type bars 14. The bail 23 is a bar conformed with the configuration of the type bars 14 which are mounted as is customary in a fan-shaped arrangement. The bail 23 is secured to a bail frame 25 which lies horizontally in the machine and is mounted for backward and forward movement. Extended guide tongues 26 are provided at the forward end of the bail frame 25. They slide in suitable hanger slots 27 in segment bracket 28. Two ears 29 are provided at the rear end of the bail frame 25. They are pivotally connected to a pair of torque rod rocker arms 30, which are pivotally supported by bearing extensions 31 of bracket 28. A bunter frame 32 is pivotally interlinked with the joint of the rocker arm 30 and bail frame 25 toward the front of the machine. The bunter frame 32 is pivotally interlinked toward the back of the frame with a hinge rod 33, which is mounted on the upper ends of arms 34 of a vertically positioned yoke member 35. The yoke 35 is pivotally connected to the escapement frame 36 by pivots 37 (Fig. 2). The yoke 35 supports the rear end of the bunter frame 32 and permits it to move backward and forward in the machine as the yoke rotates about its pivot 37.

Tension spring 38 is connected between the member 39 on the escapement frame 36 to urge the bunter frame 32 with its associated bail frame 25 in a forward direction at all times. The guide tongues 26 serve as a stop against segment bracket 28 to limit the forward movement of the frames.

The carriage 12 is provided with a rack 40 which extends longitudinally thereof and moves with the carriage as it moves back and forth. The rack 40 meshes with a pinion 41 which is mounted on and connected to shaft 42 to drive the same on movement of the rack. Shaft 42 is mounted in suitable bearings 43 on the escapement frame 36.

A control disk 44 is mounted directly on shaft 42 and is connected thereto for rotation therewith by keying or other suitable means. The disk 44 thus rotates when the typewriter carriage moves back and forth and when the disk 44 is restricted against rotation it stops or prevents movement of the typewriter carriage. The disk 44 is circular and is suitably constructed as to dimension to ensure its durability in use. It has plane faces on each of its two sides to extend at least to provide smooth working areas against which the clamping connections or balls of two controlling clutches may operate. The disk 44 is shown with completely plain side faces, but it will be apparent to those skilled in the art that the faces need extend only enough to provide areas on the faces of the disk on which the clutches may operate.

There are two clutches designated generally by the numerals 45 and 46. The clutch 46 is rotatably suspended from the shaft 42 and is adapted to swing around the shaft axis in a pendulum movement. The control disk 44 may thus be clamped at any point in its rotation to provide an infinite number of possible variations of the extent of its rotation and therefore an infinite number of possible extents of release which may be given in the escapement which releases the carriage for its normal operation.

The clutch 45 is a fixed clutch which holds the disk in desired position. The clutch 46 moves either with or along the disk 44 between suitable stop means. The operating mechanism for synchronizing and operating the clutches and the stop mechanism will be described in detail later on in this specification. In general the clutches are operated by the hinge rod 33 so that the control disk 44 may be clamped by means of the fixed clutch 45 preventing movement of the carriage 12 which is pulled by spring tape 47 in a conventional manner from right to left of the front of the typewriter. Subsequently the swinging clutch 46 is disconnected from the control disk 44 to be reset to a prearranged setting of a control stop 48. After printing the forward movement of the hinge rod 33 clamps the swinging clutch in reset position firmly to the control disk 44. Then the fixed clutch 45 releases its hold of the control disk 44. At this time the typewriter carriage 12 is pulled by spring 47 causing the escapement shaft 42 to rotate. This rotates the control disk 44 with the swinging clutch 46 clamped thereon. This movement is arrested by a stop 49 restricting the travel of the carriage by an amount corresponding to the swing of clutch 46.

The stop 48 is moved to adjusted position to provide suitable escapement for various letters by means of a mechanism which is actuated by the depression of the parallel key levers 16. On each of the key levers 16 are provided a pair of cam followers or rollers 50, one on each side of the lever. They are retained by studs 51. These followers or rollers 50 are positioned so that they travel downwardly in the line of a vertical arc about pivot 17 when the key lever 16 is depressed. A cam shaft 52 extends from side to side of the machine transversely of the key levers 16. It is mounted for slidable and rotatable movement.

The cam shaft 52 is provided with a plurality of screw holes 53 and suitable notches 54. On one side of cam shaft 52 and firmly attached thereto are a plurality of upwardly extending candelabra-shaped yoke cams 55. These cams are positioned adjacent the key levers 16 and in a position to be engaged by the followers or rollers 50 as the key levers 16 are moved downwardly.

The cam shaft 52 is supported for pivotal movement on pivots 56, which are riveted to mounting lugs 57, which are attached to the frame 10 in a suitable manner.

Figure 12:
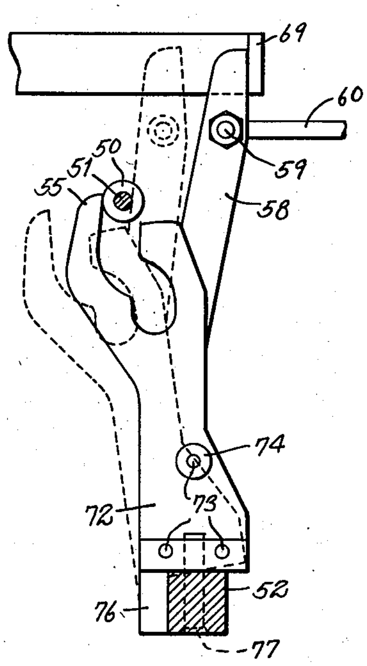
Fig. 12 is a detailed, partial view of one of the cams employed to control the escapement mechanism to allocate the proper spacing to the characters.

When one of the key levers 16 is depressed for printing a character, the roller or follower 50 moves down into and engages one of the yoke cams 55 and the cam shaft 52 is rotated an amount depending upon the shape of the cam track. The movement is illustrated in Fig. 12, where the roller 50 is shown in full lines entering the track of cam 55, likewise shown in full lines. When the cam roller or follower 50 moves to its lowermost position it will move the cam to the dotted line position shown in that figure, thus rotating the cam shaft 52 an amount corresponding to the shape of the track.

Near the center of the machine one of the cams 55 is provided with a nose arm 58 which extends upwardly and above the pair of key levers 16. The nose arm 58 is suitably apertured to provide a pivotal connection or joint 59 for the front end of a link rod 60 which is mounted for forward and backward movement. This rod lies horizontally and extends freely between and beyond the type bar levers 18 toward the back of the machine. The rear end of link rod 60 is pivotally connected with a horizontally swinging arm 61 which is secured to the bottom end of a vertically positioned spindle or rod 62 which is journalled in the escapement frame 36. The spindle or rod 62 is pivotally supported at the bottom by a bearing 63 secured to the escapement frame base 64. A mounting strap 65 secured to escapement frame 36 pivotally supports the upper end of the spindle or rod 62, where it is attached to a horizontally swinging pitch setting arm 66 which carries the stop 48 which, as has been stated before, is so positioned that it will engage the escapement clutch 46. The arm 66 is positioned to swing the stop 48 to various positions in the path of the escapement clutch 46.

A retractile spring 67, which is attached to a post 68 on the escapement frame base 64, urges the link rod 60, with its engaged parts, in a backward direction at all times. A suitable stop is provided by engagement of the nose arm 58 against the hook 69, which is secured to the comb 70.

The cam tracks of the yoke cams 55 are so arranged that when the key lever 16 carrying a roller or follower 50 is depressed, the working surface of the cam is engaged to move it as shown in Fig. 12. The bottom of the cam track in each of the cams, however, is merely a dwell. This is provided so that the proper setting of the stop 48 is obtained before the cam 24 engages the bail 23 to bring about a release of and setting of the escapement mechanism in a manner which will be described later. The dwell thus provided in the cam holds the stop 48 in the position determined by the cam, which in turn depends upon the particular character carried by the corresponding type bar 14, thus accurately setting the escapement mechanism prior to the release thereof and holding it for the period of release and resetting.

It will be obvious that as the cam is engaged and moved as shown in Fig. 12 that the forward pull on the nose arm 58 will produce a forward pull on the rod 60, a rotation of the arm 61, shaft 62 and arm 66, which in turn will result in adjustment of the position of the stop 48.

The portion of the mechanism described above shows clearly how the stop 48 may be adjusted to control the escapement for one series of types 15 mounted on the type bars 14. In the machine shown each type bar carries two types, one above the other when they are in printing position. As is conventional, one in most machines will be the capital letter and the other the lower case letter. Since in most fonts of type the amount of space required varies between capital and lower case letters, in the preferred form of the invention there are provided a plurality of yoke cams for both capital and lower case letters. The cams are similar to the cams 55 and are indicated at 72. The yoke cams 72 are arranged adjacent to the cams 55, but on opposite sides of the key levers 16, so that they are engaged by the cam followers or rollers 50 on the opposite side of the levers 16 from the followers or rollers 50 which engage the cams 55. They are spaced from the cams 55 by a distance substantially equal to but slightly greater than the distance represented by the thickness of the levers 16 and the amount of extension of the cam followers 50 from the levers 16.

Figure 13:
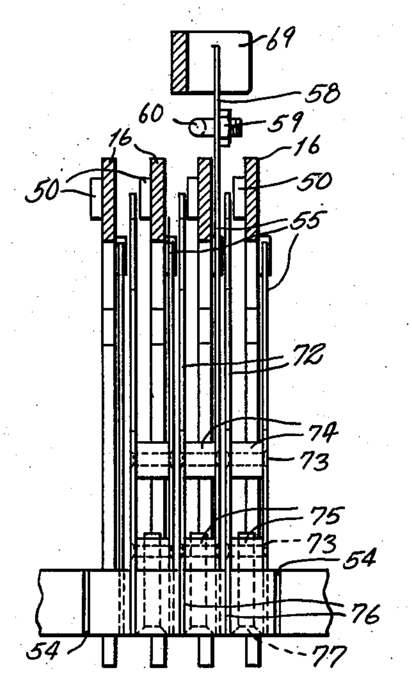
Fig. 13 is a detailed view of a portion of these cams showing their relation to the key levers.

The cams 55 and 72 are preferably joined together in pairs by rivets 73, as is best seen in Fig. 13, and are held parallel to one another by spacers 74 and tie bar 75. Both sets of cams are furnished with locating tongues 76 which extend downwardly on opposite sides of the cam shaft 52 and fit into the notches 54. They are held in place by a suitable screw which extends through the hole 53 and engages the tie bar 75 and secures it firmly to the cam shaft 52.

Whether the cam 55 or the cam 72 will be actuated by downward movement of the key lever 16 is determined by the laterally shifted position of the cam shaft 52, which is pivotally mounted on the studs 56 and along which the cam shaft is shiftable. The shifting of the cam shaft 52 on the studs 56 is accomplished by means of wedge-like shifting yokes which engage guide blocks 78, which are mounted on cam shaft 52. The guide blocks 78 are provided with wedge grooves 79, which are engaged by the wedged faces of the wedge yokes 80 and 81, whose faces are disposed to positively shift and position the cam shaft 52 in laterally shifted positions.

The ends 82 of the yokes 80 and 81 are pivotally connected to bell cranks 83 which are disposed on opposite sides of the machine and are directly and firmly attached to the standard shift lock release shaft 84 which is rotatably mounted at 85 on the sides of the frame 10. The actuating arms 86 of the bell cranks 83 are connected by a link 87 to the shift key levers 89 on the sides.

The typewriter basket shifting mechanism, which is standard and forms no part of this invention, has not been shown in detail. It will be understood, however, that it is actuated by the levers 89, as is customary, so that the shifting of the cam shaft 52 will be effected simultaneously with the shifting of the basket in a conventional way.

When the shift key lever 89 is depressed to shift the basket, the connecting link 87 actuates the shaft 84 and also actuates the cranks 83 in synchronism. Simultaneously both yokes 80 and 81 by means of their operative connection with the bell crank arms move horizontally toward the back of the machine. The forked yoke ends with their wedge-like faces engage the guide blocks 78 to shift the cam shaft 52 along the pivots 56. This shifting will move one set of yoke cams to a position in which they will not be engaged by the rollers 50 and will bring the other set of yoke cams into position for engagement.

The rest stop 49 is adjustable for justifying the line of printed material either by adjusting all spacing or by adjusting spaces between individual words or characters. It is part of an upwardly extending bell crank 90 which is pivotally secured to the escapement frame 36 by a stud screw 91. Pivotal movement of the stop 49 in a counter-clockwise direction about the stud screw 91 will add to the swing of the swinging clutch 46, while clockwise movement about the stud screw 91 will subtract from the swing, thus reducing the amount of release by the escapement mechanism. A pin 92 operatively joins the vertical clevis rod 93 to the bell crank 90. The lower end of the rod 93 protrudes slidably through a guide hole 94 in the escapement frame base 64. Vertical movement of the rod 93 is brought about by the wedge end 95 of horizontal slide 96, which is provided with an elongated hole 97 inserted over the piloting end of rod 93 between the base 64 and the wedge groove 98 of the adjacent slide collar 99, which is secured to the end of rod 93 by check nut 100. The wedge end 95 and the wedge groove 98 have the same obliquity in reference to the axis of rod 93 and are provided with continuous sliding engagement with one another.

Compression spring 101 interposed between the neck of clevis rod 93 and base 64 urges the rod in an upward direction at all times with the movement upward being limited by the part 199 and the wedge end 95 of the slide 96.

The slide 96 is guided for forward movement in a groove 102 and is held by retaining lug 103. A notch 104 located in the side of the slide 96 is engaged by a crank pin 105 attached to a crank arm 106, which is pinned or otherwise secured to the end of shaft 107 which extends crosswise horizontally above the slide 96 to the outside of the mechanism. The shaft 107 is suitably supported by bearings 108 and 109. An enlarged operating shaft 110 is end-checked by the frame bearing 109 and protrudes through an aperture 111 in the side plate cover 112 to the outside of the machine. The exposed end is provided with a feather slit 113 along its axis to the lower step of a step collar 114 which is mounted on the shaft end 110 and secured by a screw 115. A flat ring 116 frames the aperture 111 and is slidably attached to the cover plate 112 by rivets 117. It is provided with a pointer line on its outer cylindrical periphery. A removable operating knob 118, having a hub step extension 119, is pushed over the shaft to mesh with step collar 114 to rotate the shaft 107. In operation turning the knob 118 with associated parts swings the crank pin 105 and with it the slide 96. This either raises or lowers the rod 93 and adjusts the position of the stop 49.

A space bar 120 is provided for controlling the space between words. It is attached to a pair of levers 121 firmly attached to a shaft 122, which extends horizontally from side to side of the machine and is mounted for rotation in the sides of the frame 10. A torsion spring 123 connected to the shaft and resting against the frame urges the space bar 120 upwardly at all times with, however, its upward motion limited by extension 124, which engages against a stop 125 attached to frame 10. A hook nose lever 126 is secured to the shaft 122. It extends upwardly between key levers 16 and is adapted to transmit movement to the arm 127 of the escapement yoke member 35. Depression of the space bar 120 thus moves the yoke 35 and the hinge rod 33 is rotated to control the escapement clutches in their function. In this connection it should be noted that the stop 48 is always set for the smallest escapement so that operation of the space bar merely gives the smallest escapement permitted by the stop 48 in this position.

Figure 21:
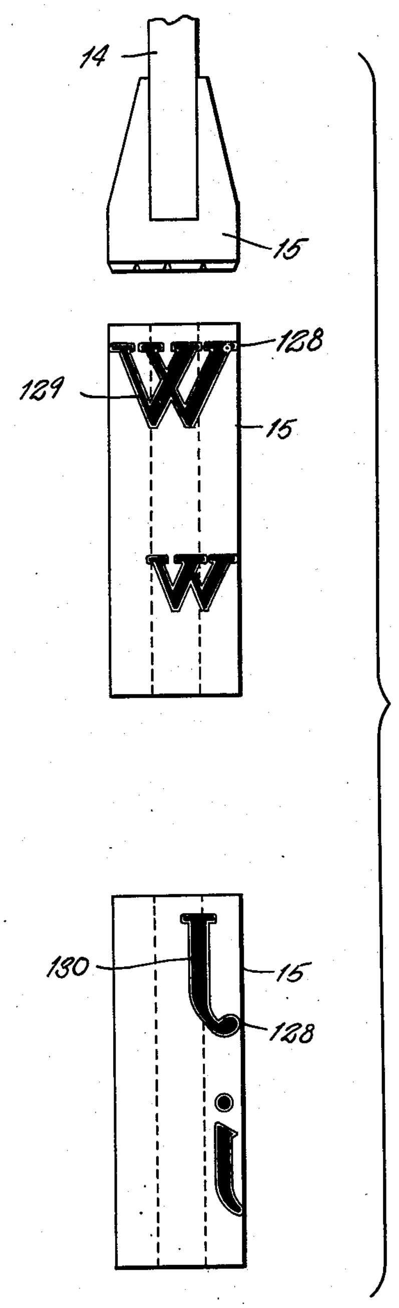
Fig. 21 is a view showing the types and their position relative to the initial printing line for the characters showing how the characters are disposed on the faces of the types.

In Fig. 21 the types 15, which are attached to the type bars 14, are shown in enlarged detail. All of the types are arranged to print their initial edge, which is indicated at 128, to the same point and the characters, indicated at 129 as a "w," extend from this initial edge across the face of the types 15. In a case of a narrower character such as is indicated at 130, the initial edge lies at 128 but the final edge does not extend as far. The mechanism above described through the adjustment of the stop 48 provides a release of the escapement for each letter or character which corresponds to its width and the amount is proportionate so that the next letter printed will be spaced the same amount from the letter just printed as every other letter or character.

Figure 20:
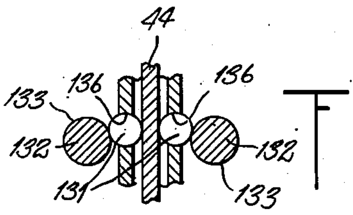
Fig. 20 is a detailed sectional view on line 20—20 of Fig. 3 showing further details of the fixed clutch.

The fixed ball clutch 45, which holds the wheel 44 while the movable clutch 46 is shifting position, consists of a pair of balls 131 which are disposed on opposite faces of the wheel 44 near the periphery. A pair of guiding and wedging members 132 are provided adjacent the balls and they have a reduced annular wedging ball seat 133 which is circular in cross section and which backs up the balls so that they may firmly grip the disk when the clutch is engaged. A channel-shaped ball yoke 134 is disposed between the member 132 and is guided by the surfaces 135 thereof. The channel-shaped ball yoke 134 straddles the wheel 44 and is provided with apertures 136 in which the balls 131 are retained loosely enough to permit rotation. With this arrangement downward movement of the ball yoke 134 wedges the balls against the faces of the wheel 44 and against the ball seats 133 of the members 132, as is best seen in Fig. 20.

Figure 18:
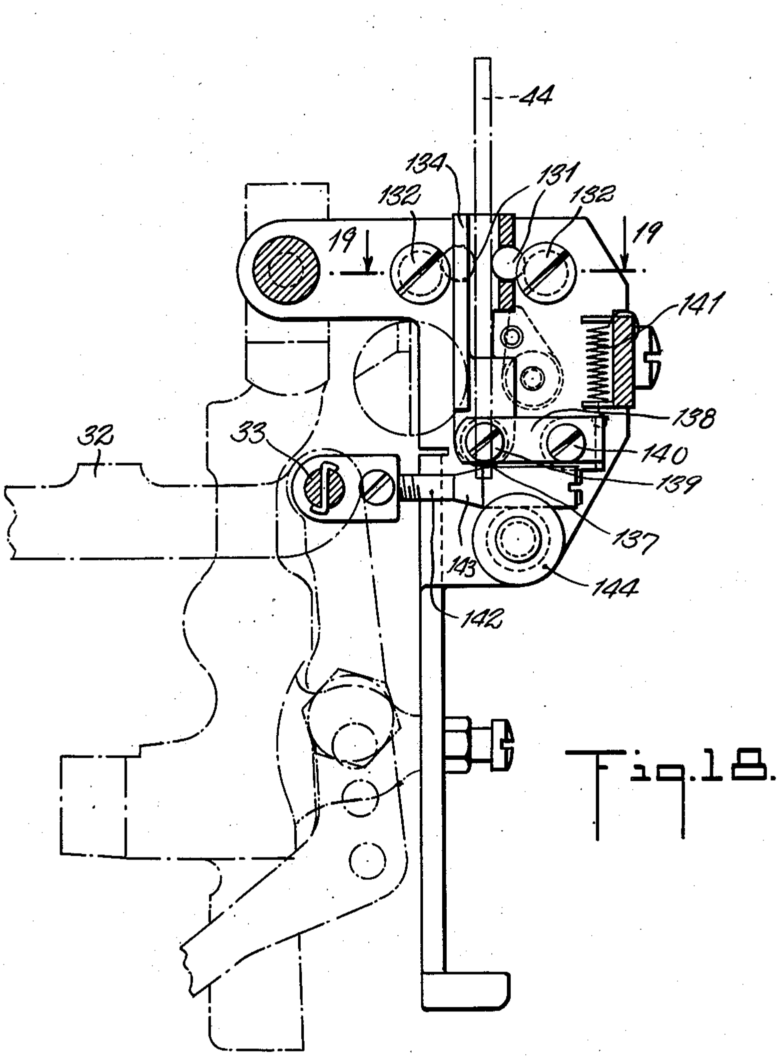
Fig. 18 is a detailed sectional view on the line 18—18 of Fig. 3 showing the mechanism for controlling the fixed clutch.
Figure 19:
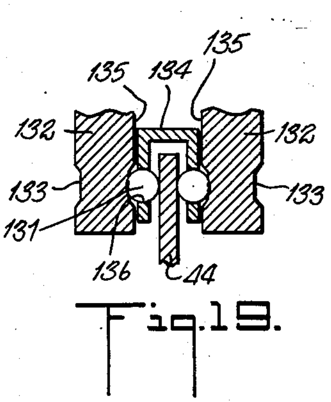
Fig. 19 is a detailed sectional view taken on the line 19—19 of Fig. 13 showing details of the fixed clutch.

At the lower end of the ball yoke 134 is a roller 137 and a pivotal lateral extension 138 which is pivoted at 139 to the ball yoke 134 and pivoted to the frame at 140. A retractile spring 141 urges the right-hand end of the extension 138 upwardly, as viewed in Fig. 18, tending to force the ball yoke 134 downwardly into clutch-engaging position.

The ball yoke 134 is actuated by a projecting member 142 which is mounted on the rod 33, which is attached to the bunter frame 32. The member 142 is provided with a tapered camming surface 143 which is positioned to engage the roller 137. The member 142 is screw-threaded for adjustment and is provided with a backing or positioning roller 144. The camming surface 143 is so disposed that on the first movement of the bunter frame 32 and rod 33 toward the right, as viewed in Fig. 18, the ball yoke 134 is allowed to move downwardly to engage the fixed clutch to cause it to hold the wheel 44.

Figures 9, 10:
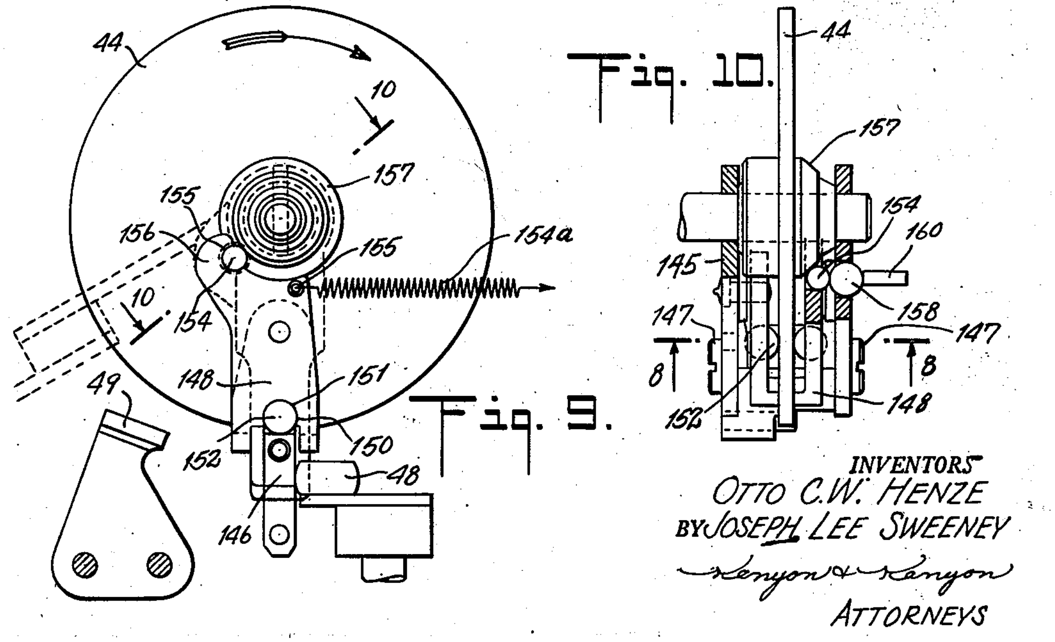
Fig. 9 is a detailed view showing the arrangement of the escapement disk and the stop members in relation to the movable clutch.
Fig. 10 is a detailed, sectional view taken on the line 10—10 of Fig. 9 showing the details of the movable clutch and releasing mechanism therefor.
Figure 11:
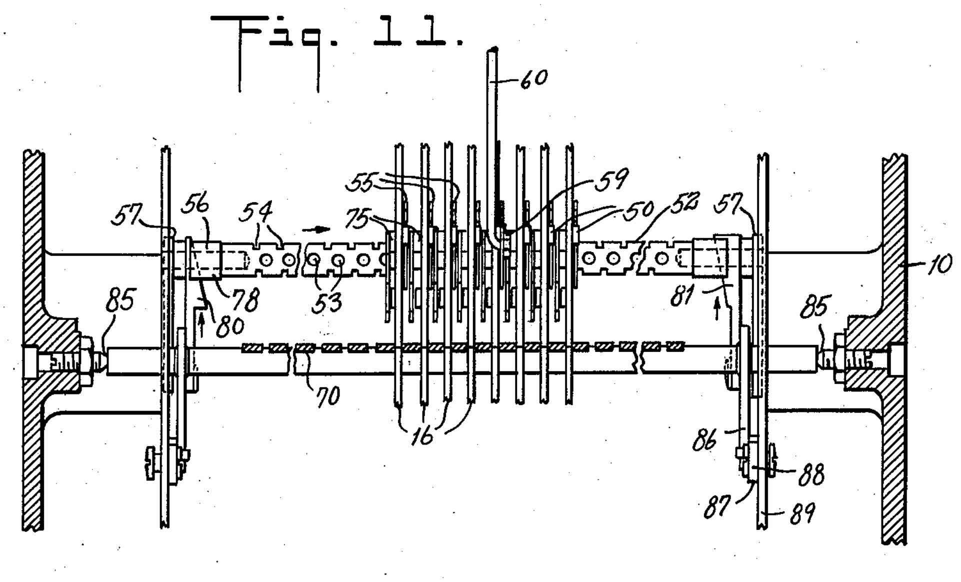
Fig. 11 is a partial, sectional, plan view broken away and showing the means for shifting the cam shaft to take care of upper and lower case characters.

The movable clutch 46 is mounted on a pair of hangers 145 which are pivoted about the shaft 42. A spacer block 146 connects the lower ends of the hangers 145 and is retained in position by suitable screws 147. A U-shaped ball yoke 148 is pivotally mounted between the hangers 145 on pivots 149. The arms of the ball yoke 148 embrace the wheel 44 and the central or bight portion is provided with a slot 150 to provide ball-receiving apertures 151, in which balls 152 are disposed and fitted loosely enough for rotation. The central portion of the slot 150 embraces the spacer block 146 which serves as a rest for the balls 152, as is best seen in Fig. 9. The slot 150 is larger than the spacer block 146, which allows for lost motion. Within the hangers 145 and adjacent to and backing up the balls 152 are wedge members 153 disposed so that the balls may be wedged therebetween and against the wheel or disk 44. A retractile spring 154a, which is attached at 155 to the ball yoke 140, tends to urge the hangers 145 and the ball yoke 148 in a counterclockwise direction, as viewed in Fig. 9, with the spacer block 146 in contact with the adjustable stop 48. The spring also tends to pivot the ball yoke 148 in a counterclockwise direction about its pivot 149, as viewed in Fig. 9, tending to force the balls 152 toward the right, as viewed in Fig. 9, into wedging engagement, so that the movable clutch will be engaged with the wheel or disk 44.

Means for releasing the movable clutch consist of a ball 154 which is seated in an aperture 155 in a laterally-extending portion 156 of the ball yoke 148 and positioned to engage the sloping or conical hub 157 which is mounted on the shaft 42. A ball 158 is seated in an aperture 159 in the hanger 145 and is engaged and held in place by the arm 160 of the pivoted member 161 which is pivoted on a suitable screw 162 and is provided with a torsion spring biased to urge its end 160 away from the ball 158. A push rod 164 is mounted on the rod 33 with its end positioned to engage the end 165 of the member 161 to pivot it about its pivot 162 and cause the end 160 to force the balls 158 and 154 inwardly. When this is done the ball yoke 148 is pivoted about its pivot in a counterclockwise direction, as viewed in Fig. 9, moving the balls 152 away from wedging position and releasing the movable clutch 46. An adjusting screw 166 is provided on the end 165 of the member 161 to adjust the timing of this operation.

A typical cycle of operation of this escapement mechanism consists in the movement of the rod 33 toward the rear of the typewriter under influence of a cam 24 on a type bar 14. When this rearward movement is initiated, the member 142 and its cam surface 143 move to the rear of the machine and the fixed clutch 45 becomes engaged.

At the end of an escapement cycle the movable clutch 46 lies against the stop 49 with the clutch engaged on the disk 44, holding the carriage of the typewriter in position.

As the movement of the bunter frame 32 and the rod 33 continues after engaging the fixed clutch 45, the push rod 164 engages the member 161 which pushes the balls 158 and 154 toward the tapered hub 157, thus releasing the movable clutch 46 which, under urging of spring 154*a*, swings in a counterclockwise direction, as viewed in Fig. 9, until it encounters the stop 48. By this time the bunter frame 32 and the rod 33 and push rod 164 will have started toward the front of the machine, relieving pressure on the balls 158 and 154. Thus the ball yoke 148 will urge the balls 152 into clutching position so that the clutch 46 will be engaged on the disk. Further movement of the bunter frame 32 and associated parts toward the front of the machine will carry the member 142 into position so that its cam surface 143 will engage the roller 137, raising the ball yoke 134 and releasing the fixed clutch. When this is done, the disk 44 will be released and the carriage will be moved by the spring which advances it. This will urge the disk 44 carrying the engaged clutch 46 in a clockwise direction as viewed in Fig. 9, until the clutch 46 engages the stop 49, leaving the typewriter in position for the next printing cycle.

Figures 14, 15, 16:
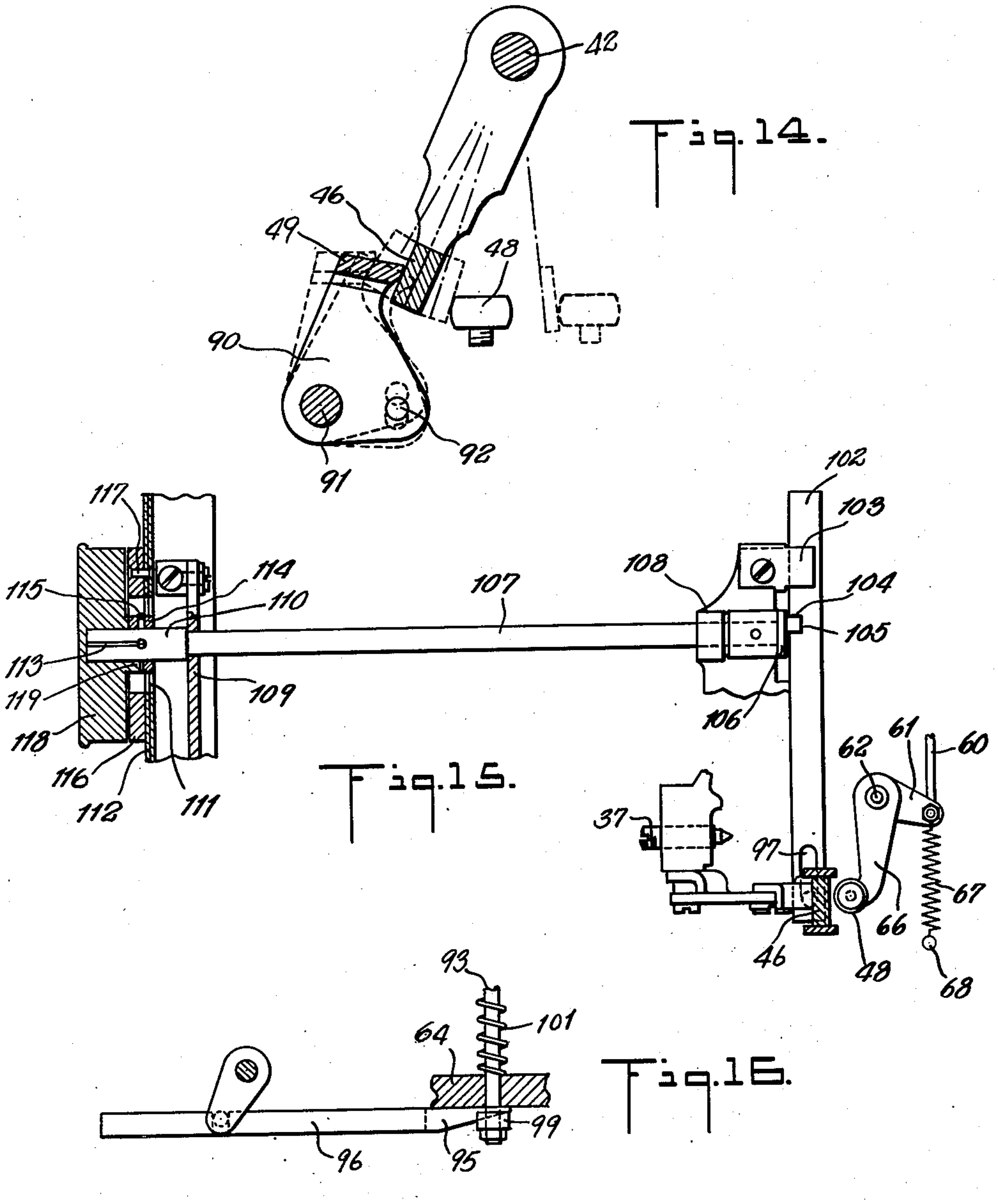
Fig. 14 is a detailed view showing the movable clutch member and the disposition of the adjustable stops relative thereto and their range of adjustment.
Fig. 15 is a partial view showing the mechanism for adjusting the position of one of the stops to provide for justification.
Fig. 16 is a detailed view partly in section of a portion of the mechanism shown in Fig. 15.
Figure 17:
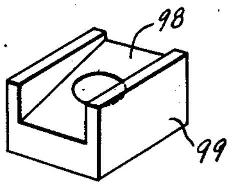
Fig. 17 is a perspective view of a cam block employed in the mechanism shown in Figs. 15 and 16.

As can be seen from Fig. 14, the positioning of the stop 48 through the actuation of the cam shaft 52 and associated parts, either in the full line position or the dotted line position, or intermediate positions, will vary the movement of the movable clutch 46, thus varying the amount of escapement. Likewise, adjustment of the stop 49 will vary the amount of escapement by an amount equal to the difference between the full line and dotted line positions shown in Fig. 14, or by an intermediate amount. Thus, it is possible with this machine to vary the amount of escapement after printing each letter or character to give the character its proper allotment of space on the printed line. It is also possible to provide a general adjustment of the escapement for all of the letters through adjusting stop 49 and it is possible by adjusting the stop 49 to merely vary the spacing between words or letters in order to obtain justification.

In the foregoing specification a preferred form of the invention has been described. It will be apparent, however, that the invention is not confined to the specific form described and that other forms of the invention can be employed. There is no intention to limit the invention to this specific form shown and described.

What is claimed is:

1. In a typewriter having a platen carriage and platen the combination of a plurality of type-carrying members, a plurality of type bodies of differing width, each mounted on one of said type-carrying members and each positioned to print its initial edge at the same point as the others, an escapement mechanism for said carriage and platen comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first adjustable stop for controlling movement of said movable clutch in one direction and a second adjustable stop for controlling movement of said movable clutch in the other direction, clutch operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, first adjusting means for adjusting the position of said first stop, second adjusting means for adjusting the position of said second stop, a plurality of actuating connectors, each connected to a single type-carrying member and to said second adjusting means, each being adapted to actuate said second adjusting means to vary the position of said second adjustable stop to a position to limit the release of said carriage by said escapement mechanism to a distance corresponding to the width of the type body carried by the corresponding type-carrying member, and means for actuating each type-carrying member and its actuating connector and said second adjusting means substantially simultaneously.

2. In a typewriter having a platen carriage and platen the combination of a plurality of type-carrying members, a plurality of type bodies of differing width, each mounted on one of said type-carrying members and each positioned to print its initial edge at the same point as the others, an escapement mechanism for said carriage and platen comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first stop for controlling movement of said movable clutch in one direction and a second adjustable stop for controlling movement of said movable clutch in the other direction, clutch operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, adjusting means for adjusting the position of said second stop, a plurality of actuating connectors, each connected to a single type-carrying member and to said second adjusting means, each being adapted to actuate said second adjusting means to vary the position of said second adjustable stop to a position to limit the release of said carriage by said escapement machanism to a distance corresponding to the width of the type body carried by the corresponding type-carrying member, and means for actuating each type-carrying member and its actuating connector and said second adjusting means substantially simultaneously.

3. In a typewriter having a platen carriage and platen the combination of a plurality of type-carrying members, a plurality of substantially parallel actuating levers each connected to a single type carrying member, a plurality of type bodies of differing width, each mounted on one of said type-carrying members and each positioned to print its initial edge at the same point as the others, an escapement mechanism for said carriage and platen comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first adjustable stop for controlling movement of said movable clutch in one direction and a second adjustable stop for controlling movement of said movable clutch in the other direction, clutch operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, first adjusting means for adjusting the position of said first stop, and second adjusting means for adjusting the position of said second stop including a cam shaft extending adjacent but transversely of said actuating levers and mounted for rotation, a cam follower on each actuating lever, a cam for each actuating lever mounted on said cam shaft adjacent its lever and having its cam surface disposed to be engaged by the cam follower of its lever, and means connecting said cam shaft to said second stop for adjusting the position of said second stop on rotation of said cam shaft, each cam surface on a cam corresponding to the body of the type-carrying member connected to the lever which operates said cam and adapted to vary the position of said second stop to provide an escapement release to position the platen carriage to provide uniform spacing between the terminal edge of the character printed by the type-carrying member and the initial edge of the next character to be printed.

4. In a typewriter having a platen carriage and platen the combination of a plurality of type-carrying members, a plurality of substantially parallel actuating levers each connected to a single type-carrying member, a plurality of type bodies of differing width, each mounted on one of said type-carrying members and each positioned to print its initial edge at the same point as the others, an escapement mechanism for said carriage and platen comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first stop for controlling movement of said movable clutch in one direction and a second adjustable stop for controlling movement of said movable clutch in the other direction, clutch operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, and adjusting means for adjusting the position of said second stop including a cam shaft extending adjacent but transversely of said actuating levers and mounted for rotation, a cam follower on each actuating lever, a cam for each actuating lever mounted on said cam shaft adjacent its lever and having its cam surface disposed to be engaged by the cam follower of its lever, and means connecting said cam shaft to said second stop for adjusting the position of said second stop on rotation of said cam shaft, each cam surface on a cam corresponding to the body of the type-carrying member connected to the lever which operates said cam and adapted to vary the position of said second stop to provide an escapement release to position the platen carriage to provide uniform spacing between the terminal edge of the character printed by the type-carrying member and the initial edge of the next character to be printed.

5. In a typewriter having a movable platen carriage the combination of a plurality of type-carrying members, a plurality of substantially parallel actuating levers, each connected to a single type-carrying member, a plurality of type bodies of differing width mounted on said type-carrying members in pairs, means for shifting said type-carrying members to place one or the other type body of each pair in printing position, each of said type bodies being positioned on its type-carrying member so that in printing position it will print its initial edge at the same point as the other type bodies, an escapement mechanism for said carriage comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first adjustable stop for controlling movement of said movable clutch in one direction and a second adjustable stop for controlling movement of said movable clutch in the other direction, clutch operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, first adjusting means for adjusting the position of said first stop, and second adjusting means for adjusting the position of said second stop including a cam shaft extending adjacent but transversely of said actuating levers and mounted for rotation and axial movement, a pair of cam followers, one on each side of each actuating lever, a plurality of pairs of cams mounted on said cam shaft, each pair having its members spaced apart and adjacent and on opposite sides of an actuating lever and each having a cam surface adapted to be engaged by one of the cam followers of the actuating lever, said cams of each pair being spaced apart a distance greater than the thickness of the lever and the distance a cam follower extends from the lever so that downward movement of the lever between the cams of a pair will engage only one cam with a cam follower, means for shifting the cam shaft axially to place either one or the other cam of a pair into position for engagement by a cam follower on an actuating lever, and means connecting said cam shaft to the second stop for adjusting the position of said second stop on rotation of the cam shaft, each cam surface on a cam corresponding to a type body of the type-carrying member connected to the lever which operates said cam and adapted to actuate said second stop to provide the length of release by said escapement mechanism to position the platen carriage to provide uniform spacing between the terminal edge of the character printed and the initial edge of the next character to be printed.

6. In a typewriter having a movable platen carriage the combination of a plurality of type-carrying members, a plurality of substantially parallel actuating levers, each connected to a single type-carrying member, a plurality of type bodies of differing width mounted on said type-carrying members in pairs, means for shifting said type-carrying members to place one or the other type body of each pair in printing position, each of said type bodies being positioned on its type-carrying member so that in printing position it will print its initial edge at the same point as the other type bodies, an escapement mechanism for said carriage, adjustable means for varying the length of release provided by said escapement mechanism, and actuating means for said adjustable means, including a cam shaft extending adjacent but transversely of said actuating levers and mounted for rotation and axial movement, a pair of cam followers, one on each side of each actuating lever, a plurality of pairs of cams mounted on said cam shaft, each pair having its members spaced apart and adjacent and on opposite sides of an actuating lever, and each having a cam surface adapted to be engaged by one of the cam followers of the actuating lever, said cams of each pair being spaced apart a distance greater than the thickness of the lever and the distance a cam follower extends from the lever so that downward movement of the lever between the cams of a pair will engage only one cam with a cam follower, means for shifting the cam shaft axially to place either one or the other cam of a pair into position for engagement by a cam follower on an actuating lever, and means connecting said cam shaft to the adjustable means for varying the length of release provided by the escapement mechanism to actuate said adjustable means on rotation of the cam shaft, each cam surface on a cam corresponding to a type body of the type-carrying member connected to the lever which operates said cam and adapted to actuate said adjustable means to provide the length of release by said escapement mechanism to position the platen carriage to provide uniform spacing between the terminal edge of the character printed and the initial edge of the next character to be printed.

7. In a typewriter having a movable platen carriage the combination of a plurality of type-carrying members, a plurality of substantially parallel actuating levers, each connected to a single type-carrying member, a plurality of type bodies of differing width mounted on said type-carrying members in pairs, means for shifting said type-carrying members to place one or the other type body of each pair in printing position, each of said type bodies being positioned on its type-carrying member so that in printing position it will print its initial edge at the same point as the other type bodies, an escapement mechanism for said carriage, adjustable means for varying the length of release provided by said escapement mechanism, and actuating means for said adjustable means, including a cam shaft extending adjacent but transversely of said actuating levers and mounted for rotation and axial movement, a pair of cam followers, one on each side of each actuating lever, a plurality of pairs of cams mounted on said cam shaft, each pair having its members spaced apart and adjacent and on opposite sides of an actuating lever, and each having a cam surface adapted to be engaged by one of the cam followers of the actuating lever, said cams of each pair being spaced apart a distance greater than the thickness of the lever and the distance a cam follower extends from the lever so that downward movement of the lever between the cams of a pair will engage only one cam with a cam follower, means for shifting the cam shaft axially to place either one or the other cam of a pair into position for engagement by a cam follower on an actuating lever, means operatively connecting said means for shifting said type-carrying members and said last-mentioned means, and means connecting said cam shaft to the adjustable means for varying the length of release provided by the escapement mechanism to actuate said adjustable means on rotation of the cam shaft, each cam surface on a cam corresponding to a type body of the type-carrying member connected to the lever which operates said cam and adapted to actuate said adjustable means to provide the length of release by said escapement mechanism to position the platen carriage to provide uniform spacing between the terminal edge of the character printed and the initial edge of the next character to be printed.

8. In a typewriter having a platen carriage and platen the combination of a plurality of type-carrying members, a plurality of substantially parallel actuating levers, each connected to a single type-carrying member, a plurality of type bodies of differing width each mounted on one of said type-carrying members and each positioned to print its initial edge at the same point as the others, an escapement mechanism for said carriage and platen comprising a rotatable control disk, means connecting said disk to said carriage for rotation on movement of said carriage, a ball clutch acting on the face of said disk and fixed with reference to the axis of said disk, a ball clutch mounted for swinging movement about the axis of said disk and operable to clutch and hold said control disk at any point during the arc of its movement, a first adjustable stop for controlling movement of said movable clutch in one direction and a second adjustable stop for controlling movement of said movable clutch in the other direction, clutch-operating means for operating said clutches in such sequence that the fixed clutch locks the disk against movement in one direction while the second clutch moves circumferentially of the disk and thereafter the first clutch releases the disk and the second clutch engages and travels with it until the second clutch abuts one of said stops, means for actuating said clutch operating means connected for operation with said type-carrying members, first adjusting means for adjusting the position of said first stop, and second adjusting means for adjusting the position of said second stop simultaneously with the actuation of a type-carrying member comprising a cam shaft extending adjacent but transversely of said actuating levers and mounted for rotation, a cam follower on each actuating lever, a cam for each actuating lever mounted on said cam shaft adjacent its lever and having its cam surface disposed to be engaged by the cam follower of its lever, and means connecting said cam shaft to said second stop for varying the position of said second stop and thereby varying the length of release provided by the escapement mechanism on rotation of said cam shaft, each cam surface on a cam corresponding to the type body of the type-carrying member connected to the lever which operates said cam and adapted to vary the position of said cam shaft and said second adjusting means to limit the release of the carriage to a distance corresponding to the width of the type body carried by the corresponding type-carrying member.

OTTO C. W. HENZE.
JOSEPH LEE SWEENEY.

REFERENCES CITED

The following references are of record in the file of this patent:

UNITED STATES PATENTS

| Number | Name | Date |
|---|---|---|
| 2,111,410 | Stickney | Mar. 15, 1938 |
| 2,167,812 | Muller | Aug. 1, 1939 |
| 2,202,565 | Reid | May 28, 1940 |